(12) United States Patent
Yoseloff et al.

(10) Patent No.: US 6,464,581 B1
(45) Date of Patent: Oct. 15, 2002

(54) VIDEO GAMING SYMBOLS PROVIDED ON A CONTINUOUS VIRTUAL REEL

(75) Inventors: Mark L. Yoseloff; Russell B. Dunn, both of Henderson, NV (US)

(73) Assignee: Shuffle Master, Inc., Minneapolis, MN (US)

( * ) Notice: Subject to any disclaimer, the term of this patent is extended or adjusted under 35 U.S.C. 154(b) by 17 days.

(21) Appl. No.: 09/653,738

(22) Filed: Sep. 1, 2000

(51) Int. Cl.[7] ................................. A63F 13/00
(52) U.S. Cl. .................. 463/20; 463/31; 273/143 R; 273/138.2
(58) Field of Search ................. 463/21, 31; 273/143 R, 273/138.2

(56) References Cited

U.S. PATENT DOCUMENTS 3,645,531 A * 2/1972 Wright ........................ 352/104
6,089,977 A * 7/2000 Bennett ................... 273/143 R
6,095,921 A * 8/2000 Walker et al. ........... 273/138.2

* cited by examiner

*Primary Examiner*—Jessica Harrison
*Assistant Examiner*—Corbett B Coburn
(74) *Attorney, Agent, or Firm*—Mark A. Litman & Assoc. P.A.

(57) ABSTRACT

A video slot reel game is provided with a supply of symbols for the play of video gaming formats. The supply of symbols appears as an image of a continuous strip or continuous element of images in a virtual continuous loop or extended strip. For example, a continuous loop may contain 1000 symbols, the loop progresses through a first column in a video slot image (exposing the desired number of frames within the strip of the loop, for example, 1, 2, 3, 4 or 5 frames exposed for active play), the forward part of the strip of the loop is then returned to another column to expose the desired number of frames, and then the forward part of the loop is again returned to the video screen in still another column to expose another desired number of play active frames. This manner of providing the frames in a continuous (or at least extended) strip or loop provides both additional imagery and an opportunity for varying the probabilities of the game easily.

21 Claims, 8 Drawing Sheets

VIDEO GAMING SYMBOLS PROVIDED ON A CONTINUOUS VIRTUAL REEL

BACKGROUND OF THE INVENTION

1. Field of the Invention

The present invention relates to the field of gaming, particularly video gaming, and more particularly to video gaming in which the matching of symbols on rows and/or columns is used to determine winning combinations.

2. Background of the Art

Video gaming is a form of entertainment involving the display of the format of a game on a video screen (presently on a cathode ray tube or monitor, liquid crystal display screen or any other visually observable image presenting system) and the participation of a player(s) electronically engaged with the data flow to the screen. The player(s) may place wagers on the outcome of various statistically driven games which are displayed on the screen. Originally, the mechanical forerunners of video games were primarily limited to games having symbols displayed on reels, each symbol occupying a frame on the wheel, and the wheels being spun and then stopped to display a line of symbols (usually three symbols in a single row). Poker games with five cards in a single row were among the first mechanical slot type games. Payouts were provided for certain specific symbol combinations on the payout line. Certain symbols became traditional on mechanical gaming machines (e.g., slot machines) such as the number "7," cherries, bells, oranges, lemons, plums, etc. Over time, less traditional symbols were added to give the game a different visual appearance, but the play of the reel oriented slot machine game remained essentially the same.

When video gaming was first introduced to the gaming world, the first video games were electronic imitations of the traditional slot machines, even using the same symbols, and the same physical formats (e.g., a handle to initiate play), assuring that the transition from mechanical to electronic formats would meet the least resistance. As electronic gaming became more accepted, both the formats (e.g., buttons versus handles) and the game content (e.g., novel formats of poker games such as draw poker games, dominoes, keno, blackjack, Bingo, Pai Gow poker, etc.) were changed and expanded. The format of play within the electronic or virtual reel games has also progressed from the early duplications of the mechanical reels on a visual screen. The flexibility afforded the games by the use of computers, printed circuit boards, virtual images, and the high information density and volumes that can be used with electronic media, has enabled essentially unlimited formatting and image capability in the equipment. However, even with this potential, very little has been done with virtual reel games. The most notable product introductions in the virtual reel industry have included multiple payout lines on the displayed reels (e.g., payouts allowed on three rows when three tokens are played), multiple payout formats (e.g.,. payouts in rows, columns, diagonals, and/or patterns), and the imagery of the frames (e.g., different symbols, different themes for the symbols, and even animated movement within the frames of the symbols).

The various changes that have been and may be made in the virtual reel video systems may be characterized within three types of change classes: 1) changes that affect the probability of the awards; 2) changes that affect the fundamental nature of the game; and 3) changes that provide an entertainment or aesthetic variation to the game. Examples of changes that would affect the probability of awards would include, for example, selecting the total number of symbols within any reel or reels, selecting the number of any specific symbol within a reel or reels, selecting the number of lines or patterns for which there will be payouts, providing algorithms that directly modify probabilities and outcomes in the play of the game, and the like. Examples of changes that would affect the fundamental nature of the game include, for example, the ability to retain a symbol on one or more reels from a first play and then re-spin remaining reels(s), the ability of a machine or player to 'nudge' a frame within one reel to a more favorable position, and the like. Examples of changes that would provide an entertainment or aesthetic variation to the game would include, for example, variations in artwork in the frames, variations in themes in the frames or in the background of the frames, and the like. Some of the more striking artwork renditions now include, for example, faces on the symbols which alter their orientation (e.g., turn within the frame and look at another character), alter their expressions (e.g., smile or frown or laugh), or otherwise provide a different image within the frame.

In all cases, however, the imagery generally is still provided by reels (virtual or actual) that give the appearance of rotating in place, with the reels providing entire columns, entire rows, or individual frames. It is always desirable within an entertainment field, such as video gaming, to be able to provide variations in the play and appearance of games to attract and maintain players.

SUMMARY OF THE INVENTION

A supply of symbols is provided for the play of video gaming formats by an image that comprises a continuous strip or continuous element of images in a virtual continuous loop or extended strip. For example, a continuous loop may contain 1000 symbols, the loop progresses through a first column in a video slot image (exposing the desired number of frames within the strip of the loop, for example, 1, 2, 3, 4 or 5 frames exposed for active play), the forward part of the strip of the loop is then returned to another column to expose the desired number of frames, and then the forward part of the loop is again returned to the video screen in still another column to expose another desired number of play active frames. This manner of providing the frames in a continuous (or at least extended) strip or loop provides both additional imagery and an opportunity for varying the probabilities of the game easily.

A particularly preferred visual pattern for the continuous or extended loop comprises frames which are provided within a continuous loop that appears as a segment of a film strip or motion picture film, with sprocket holes, and/or black frame separations and/or borders appearing in the imagery. Other desirable images could be a snake with frames on its back, sides and/or belly, a helix with frames on various surfaces of the elements forming the helix, a train having cars with different symbols, and many other variations.

BRIEF DESCRIPTION OF THE INVENTION

DETAILED DESCRIPTION OF THE PRESENT INVENTION

Figure 1:
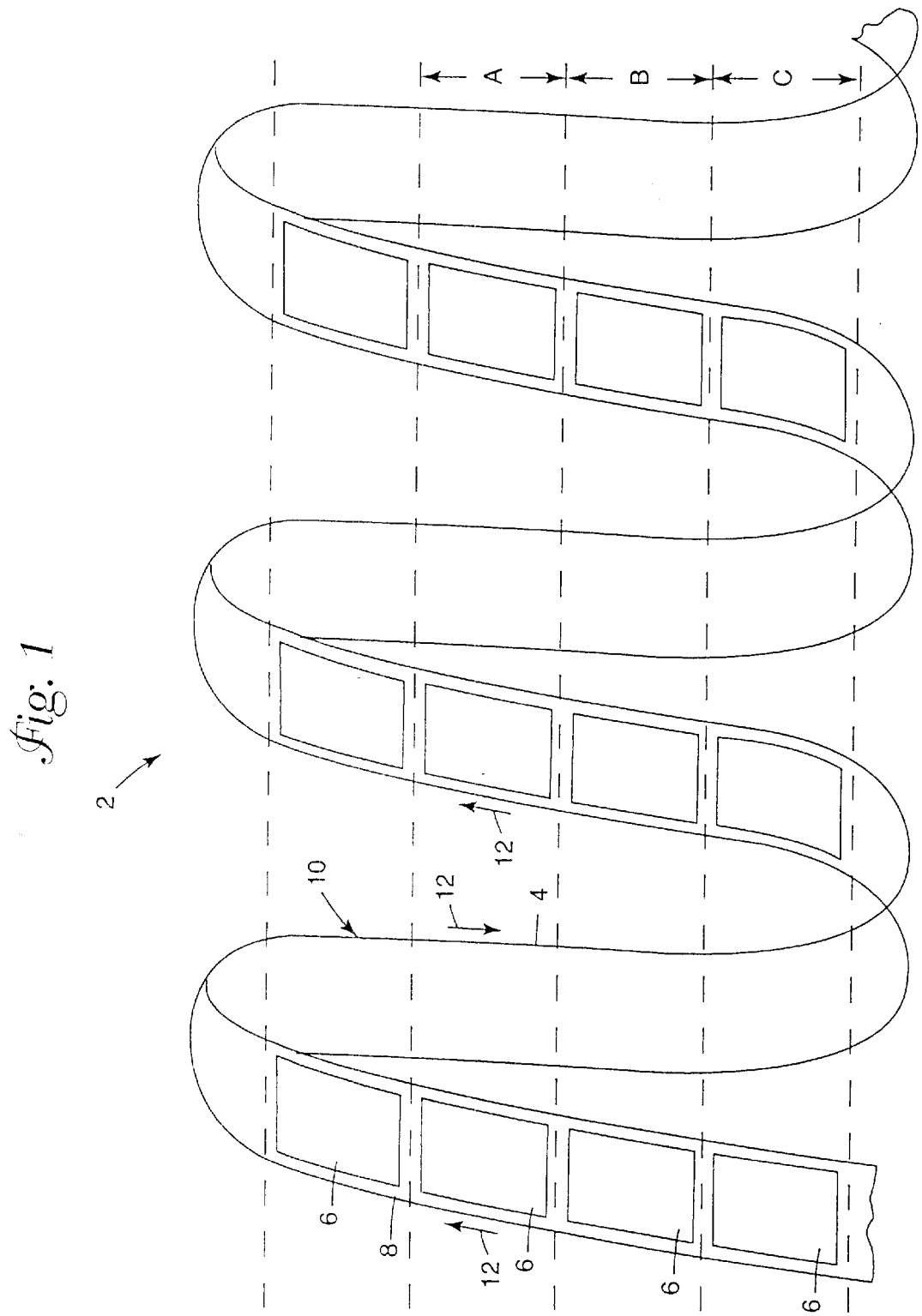
FIG. 1 shows a virtual image of a plain strip carrying symbols on one surface only which are displayed on a video screen.

One general way of describing the practice of the present invention is as a video reel slot game machine comprising a monitor and an information storage system. The information storage system (e.g., a computer, computer chip, circuit board, or connection to a data source) provides data to the monitor which displays an image of a gaming display or reel-like image having a series of columns and rows. The data of an image comprises an image of at least three columns of symbols selected from the group consisting of column 1, column 2 and column 3. These at least three columns align the symbols in at least three rows, each of the at least three columns of symbols having symbols thereon. The symbols comprise a continuing (e.g., a repeated, or fixed order) sequence of symbols from a fixed order set of $\{a_1-a_n\}$ symbols. Within the set of n symbols, there are x different symbols, each different symbol appearing one or more times in the sequences of n symbols. For example, where n=20 symbols and x=5 (A, B, C, D and E), the symbol order may be any combination of A, B, C, D and E up to using the maximum number of each symbol allowed or designed into the set, such as AABCDDB, EABCDAC, etc. These symbols are provided in a fixed order of symbols a through n, wherein n is the total number of symbols in the set. The continuing sequence of symbols passes from column 1 to at least one other of said at least three columns in the exact same sequence of symbols as were displayed on the monitor for column 1. The usual passing pattern would be from column 1 to column 2 to column 3, but this is not essential. The symbols could as easily be configured to pass from column 2 to column 1 to column 3, or from column 1 to column 3 to column 2. By altering the programming on the software for the various images, additional symbols may be added, symbols removed, the frequency of particular types of symbols appearing on the screen may be adjusted, and thus the hold and payout for the program can be readily altered. Additionally, with the software defining the borders of the frames as in a continuous motion picture film strip, the imagery of the game may be readily altered by combining two packets of software, one for the film strip itself, and the other for the content of the respective film strips, that is the imagery within each of the frames.

Another general way of describing the invention is as a video reel slot game machine comprising a monitor and an information storage system, the information storage system providing data to the monitor of an image, the data of an image comprising an image of at least three columns selected from the group consisting of column 1, column 2 and column 3, each of the at least three columns having symbols thereon, the symbols representing a continuing sequence of symbols from a fixed order set of n symbols, wherein n is the total number of symbols in the set, the continuing sequence of symbols passing from column 1 to the other of the at least three columns in the exact same sequence of symbols as were displayed on the monitor in column 1, first passing to column 2 and then passing to column 3 from column 2. The number assigned to the columns is not intended to restrict the order of the columns, but merely to identify that they are distinct columns. Column 1 may be the first, second, third, fourth etc. in a sequence of columns.

The video reel slot game may provide an image of at least three columns and the image has the appearance of a continuous strip moving without any interruption between segments comprising frames comprising the symbols. By "without interruption" it is meant that the order in which the individual symbols appear does not change and that there is some logical or physical connection between the moving strip. For example, the use of a train would have coupling units between trains or a track along which the individual cars pass. The use of a line of elephants might show them linked up trunk to tail in a parade. The use of a film strip of motion picture film would show a continuous strip of film. It is possible to break down the strip into segments, with the order maintained between the totality of symbols within the data set representing the continuous strip. For example, the parade of animals may have one segment of elephants, one segment of monkeys (e.g., hand to tail), one segment of zebras (mouth to tail or harness to harness), one segment of clowns (each clown holding onto a prop connected to a preceding or following clown), and the like. A preferred image is the image of at least three columns having the appearance of a continuous strip of motion picture film moving without any interruption between segments comprising frames comprising said symbols:

The symbols may pass from column 1 to another of said at least three columns moving a virtual distance between two rows in column 1 and the another of the at least three columns, when moving within a row of the at least three rows, and said virtual distance may be adjusted to increase or decrease by a programmer or player.

The following definitions are used in the description of the present invention and have these particular meanings when used herein.

A "continuous strip" of frames or "continuous virtual strip" of frames means that the same frames will appear in the same order as the strip or virtual strip is advanced for display. There may be as many or as few frames as desired, but the frames within the strip may remain in a fixed pattern or distribution so that the strip appears to advance each frame across one column and onto the next column. There are variations within this continuous strip as described herein.

A "frame" is the individual segment of the strip that contains an image or symbol. In the case of a moving continuous strip that appears as a motion picture film, the frames are the individual frames or cells of the film, while with other images, the frames may be different segments, such as the individual cars on a train, the individual squares on a snake skin, the individual gondolas on a carnival ride, and the like.

A "line" is the distinct ordering of symbols along which winning combinations may be determined. In traditional mechanical slot machines, the line was literally the line of (e.g., three) symbols forming a row on the displayed reel surfaces. In video gaming equipment, the line may be any preselected or even random position of frames that may constitute a winning combination. Patterns such as diamonds, squares, "V's," or any other preselected pattern may constitute a line. This is also commonly referred to as the pay line in video gaming equipment, for that line determines what ordering of symbols and arrangement of symbols will provide a payout to the player.

Reference to the Figures will assist in better appreciating the nature and scope of the present invention.

FIG. 1 shows virtual image 2 of a plain strip 4 carrying symbols 6 on one surface 8 only which are displayed on a video screen (not shown). The back surface 10 does not display any figures or symbols in this example of the invention. The payout lines may, for example, comprise the linear lines represented by all of the symbols along horizontal zone A, horizontal zone B, and horizontal zone C. The plain strip 4 advances along direction 12, with the strip 4 curling back and forth into view to display the symbols 6 along the various linear lines A, B and C. The symbols 6 and the virtual film strip 4 advance in a manner that provides the visual appearance of a single continuous strip moving across the face of the monitor (not shown).

Figure 2:
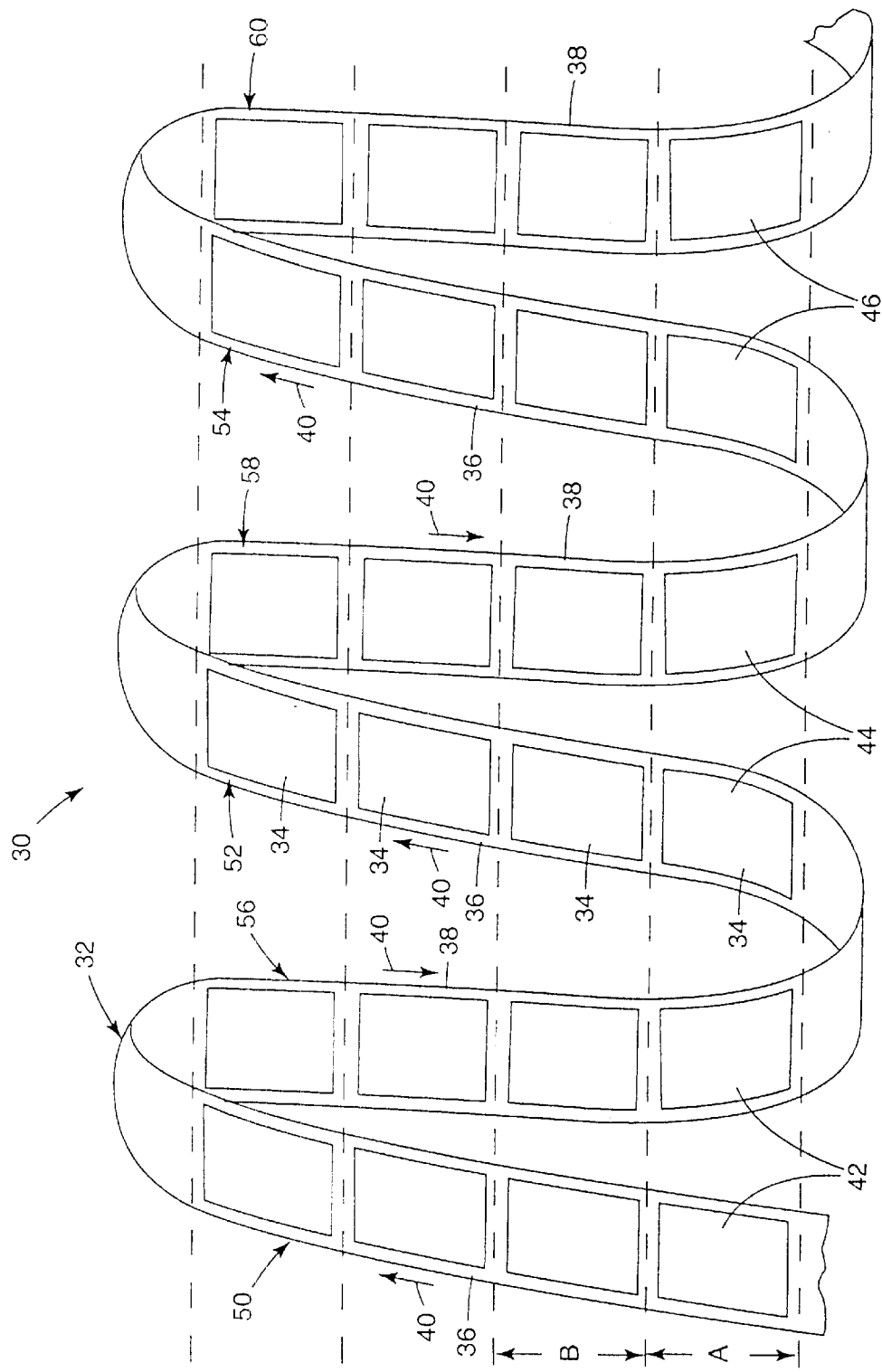
FIG. 2 shows a virtual image of a plain strip carrying symbols on both surfaces which are displayed on a video screen.

FIG. 2 shows a virtual image 30 of a plain strip 32 carrying symbols 34 on a front surface 36 and a rear surface 38 which are displayed on a video screen (not shown). The symbols 34 and the virtual film strip 32 advance in a manner that provides the visual appearance of a single continuous strip moving across the face of the monitor (not shown). In one example of the invention, the symbols appearing as rear surface 38 are mirror images of symbols appearing on the front surface 36. This configuration allows for many variations in play. If only film strip surfaces 50, 52 and 54 are allowed as active symbol matching surfaces, a standard type of slot play will occur, where the symbols 34 are read in sets of three in the defined payout lines. Where film strip surfaces 56, 58 and 60 are also combined into play, not only may different payout lines be engaged, but also different underlying games may be played. For example, rather than merely having payouts for three preselected (or one or two special) symbols, special value payouts may be made with matched pairs (42, 44 and 46) of symbols to matched pairs of symbols (42, 44 and 46) within a single payout line (e.g., horizontal zone A).

Figure 3:
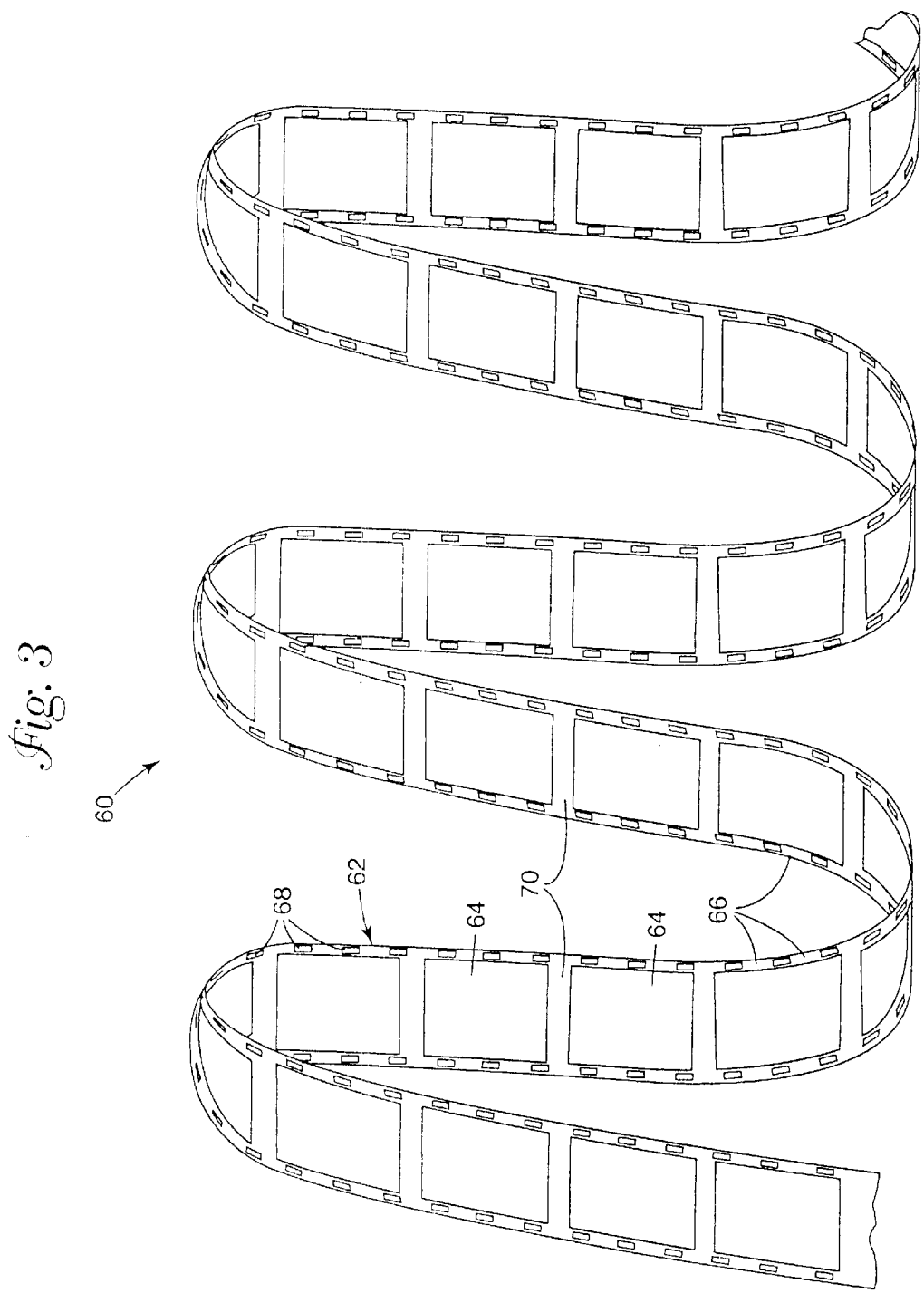
FIG. 3 shows a virtual image of a motion picture film strip carrying symbols on both surfaces which are displayed on a video screen.

FIG. 3 shows another format for the continuous supply of virtual continuous film strip 60 that is in the form of a continuous strip of motion picture film 62. The continuous strip of motion picture film 62 has all of the imagery of motion picture film with individual frames 64, dark borders 66 around the frames 64, sprocket holes 68 within the dark borders 66, and frame spacing border bars 70. As with the plain film strip in FIG. 2, exposure of the frames 64 may enable the play of various different format games, while at the same time providing an enhanced visually entertaining appearance on the monitor. In addition, revealing all of the symbols increases excitement by creating the impression that the play of the game is at least partially skill-based.

Amongst the visually entertaining imagery that may be used to enhance the play of the video wagering game would be a thematic association of the images within the continuous strip that relate to specific theatrical events or specific characters or specific movies. As non-limiting examples of functional formats for the practice of the invention are included:

a) frames which have characters and/or symbols representative of a theatrical topic, such as The Three Stooges (e.g., figures of Curly, Larry and Mo, with possibly Shemp as a wild card or special bonus feature, a pair of fingers jabbing at a pair of eyes, a hand slapping a face, a waggling hand, with words "Nyuk, nyuk nyuk," and the like), the Marxs Brothers (with images of Groucho, Chico, Harpo and Zeppo, with possibly Gummo as a special award feature; as a special set of symbols having a moustache, a horn, Chico's cocked hat, a piano, a harp, a cigar, and the like), The Wizard of Oz (with symbols of Dorothy, the Cowardly Lion, the Tin Man, the Scarecrow, Toto, the Wicked Witch of the West, Glenda the Good Witch of the East, flying monkeys, and the like), a horror movie theme (with figures of Frankenstein, Dracula, the Wolf Man, rats, spiders, coffins, and the like), a monster movie theme (with Godzilla, King Kong, Mothra, giant squid, the Blob, and the like);

b) frames which, as they move, provide a motion picture image of a theme, with symbols embedded in smaller image size on the moving image. For example, a screen from one of The Three Stooges' movies may be shown, with a miniaturized symbol in a corner, side and/or middle of the frames. When the "movie" segment stops, the miniaturized frames with the symbols thereon are enlarged to a more viewable size, so that they may be more easily read. This feature adds a number of interesting alternatives. The movie may be shown for entertainment value, yet the symbols would not be seen. This enables the use of random movie scenes (that would not correspond to the frames with the game play symbols thereon) so that the player may elect to stop the movie at any time, thereby providing more of an interactive effort on the part of the player in selecting a stopping time for the motion of the film strip. In this format, the motion picture image shown by the movement of the continuous film strip would be independent from the parade of symbols, even though both might be moving at the same frame speed across the monitor screen. In this format, the symbols would be provided in a continuous and unvarying order (and possibly fixed in their ordering, although they might be remapped at selected intervals in the programming of the game software), but the moving picture image may be randomly or routinely varied. Special bonuses could be provided when winning combinations of symbols are obtained particular or when particular scenes are shown during the spin of the wheel (e.g., double bonuses when King Kong is shown on top of the Empire State Building or when Dorothy pours water on the witch);

c) The film may be provided with a 'nudge' feature. As understood in the video slot gaming art, a nudge feature is a situation where a player or the machine (automatically) shifts a frame (or in this case a single frame on the continuous strip or a nudge of the entire continuous strip, shifting every frame one space) one additional space. This shift is performed in an effort to assist in aligning valuable symbols. Where symbols are aligned in one or more payout lines in the displayed frames of the continuous strip, and there are no winning combinations or there is a low winning combination, the frames may be shifted (as noted by shifting a single frame in a single column, more than one frame in more than one column, or shifting the entire film strip, thereby shifting every frame in every column). This type of nudge feature (although not known to be used with a continuous feed of frames on a continuous strip), is known in the video slot industry, as with the "Double Diamond" video slot game. That nudge feature allows a frame to shift one half or one whole position along a column, and usually within only a single column. There is no nudge feature known which forces all frames to shift one space as would occur with a continuous feed of symbols along a continuous strip; and d) additional awards such as the display of video segments of movies may be awarded while a major award is being totaled to the winner. The use of a video, film clip, special animation or the like as an entertainment feature is practiced in the art with regard to the play of the "Elvis" slot machine, but that feature is triggered by selected outcomes in a standard reel slot machine, and does not involve play with a virtual continuous strip format.

The provision of all of the symbols on a single continuous stream or strip of virtual information, as opposed to the provision of the symbols on streams for individual, separately rotated virtual reels, fundamentally alters the nature of the mathematics and the structure of the mathematics used in the formulation of the games and therefore further distinguishes this format from all previous formats for play of video reel slot games. In the construction of the outcome distribution on standard reel slot machines, the control of the probabilities is done by structuring the frequency of occurrence of specific symbols on each reel and then structuring the frequency of occurrence of combinations of symbols between the three (or more) reels. For example, if the frequency of a particular symbol on the first reel is 0.3, the frequency of a second matching symbol on a second reel is 0.2, and the frequency of a matching third symbol on a third reel is 0.1, the frequency of all three symbols occurring on a single pay line would be about 0.3×0.2×0.1 or 0.006. The frequency of payouts and specific combinations would be determined approximately on the basis of the multiplied frequency of the appropriate symbols appearing on each of the three reels.

In the practice of the present invention, the frequency is based upon a fundamentally different principle than either mechanical or virtual reel slots, since the frames or columns do not actually change independently of the other frames or columns. As the frames are provided on a single continuous feed (or a virtual continuous loop), when a specific single symbol appears in one frame on one pay line, the symbols on the other frames within that pay line are always also the specific single symbols and in fact are always each the same specific single symbols. Although there may be a number of the same symbols on the continuous loop, when the same specific symbol (e.g., the seventh occurrence of King Kong in the loop) appears in frame 1 or column 1, there will be specifically one image in frame 1 of column 2, frame 1 of column 3, frame 2 of column 1, frame 2 of column 2, frame 2 of column 3, etc. All of the frames and their specific position on the video screen will always be the same when that specific image and frame (e.g., the seventh occurrence of King Kong in the continuous loop) appears.

Figure 4:
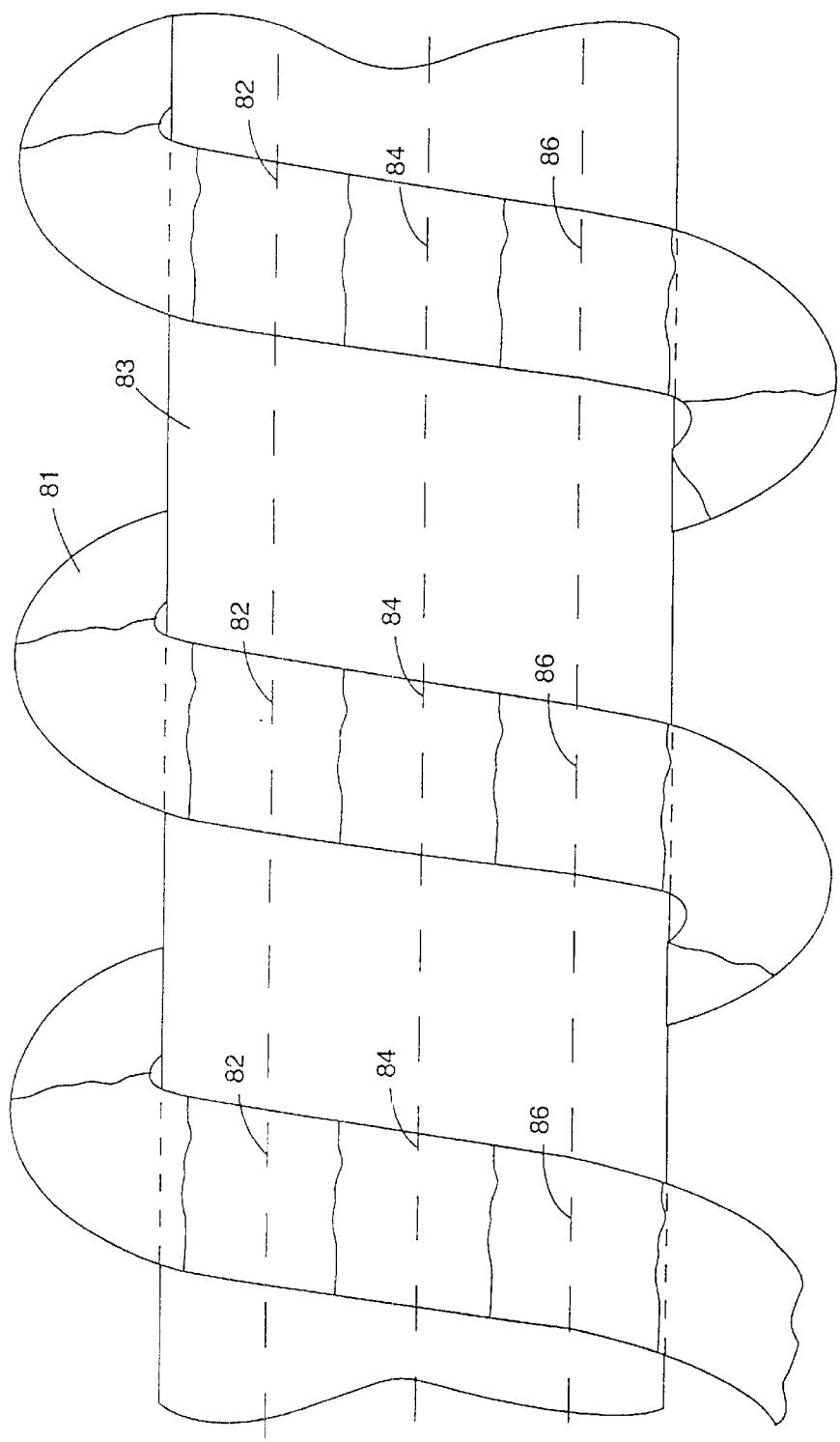
FIG. 4 shows a virtual image of a continuously moving snake with panels of skin on which images may be displayed.

FIG. 4 shows a virtual image 80 that is a representation of a snake 81 slithering around a tree limb 83. The snake 81 has sets of frames or panels 82, 84 and 86 that define pay lines. The frames or panels stop moving in positions that define pay lines that pass through all panels 82 all panels 84 and all panels 86, if three pay lines have been wagered upon.

Figure 5:
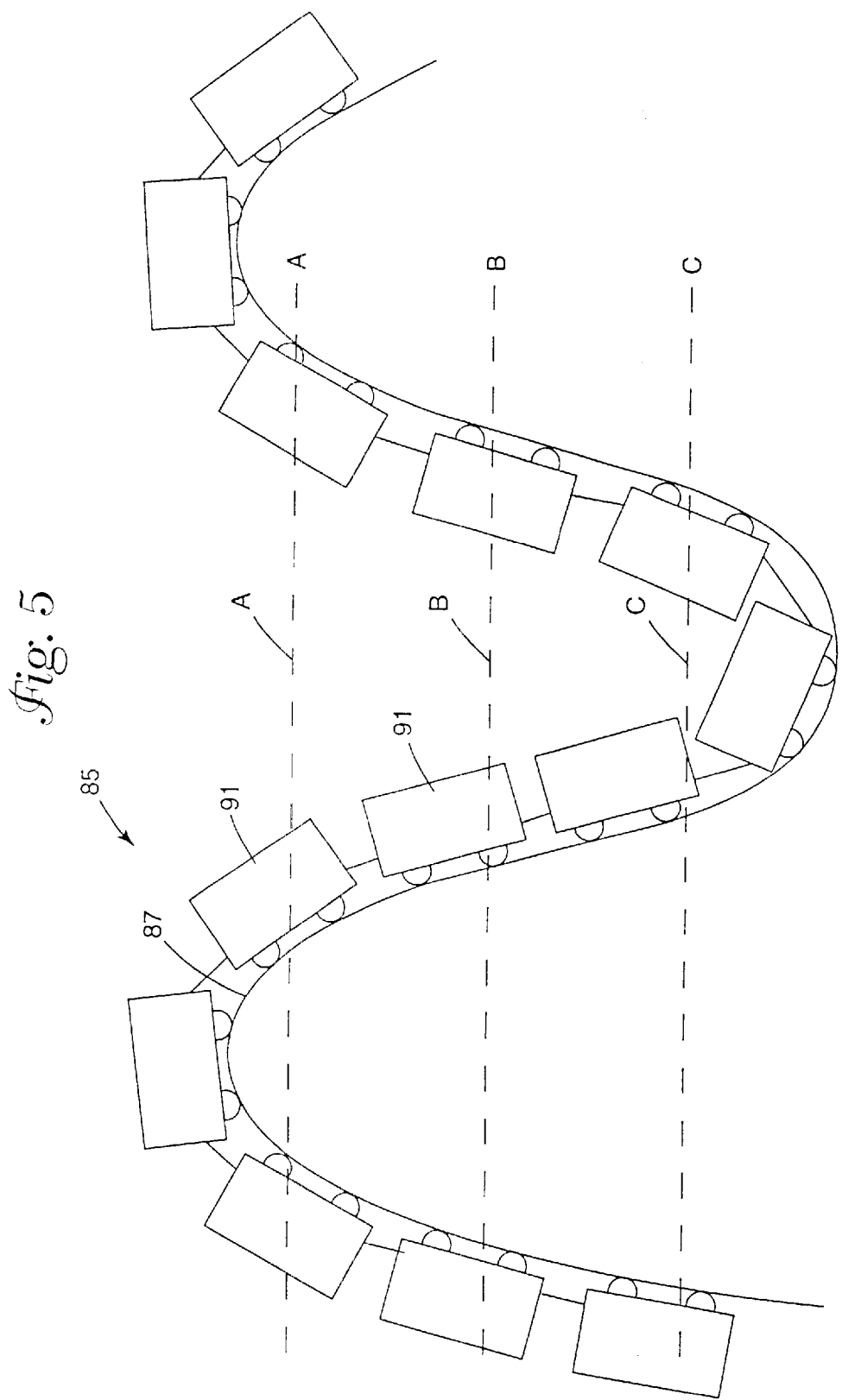
FIG. 5 shows a virtual image of a continuously moving train where the sides of the train cars may carry an image for display.

FIG. 5 similarly shows a train 85 moving along a track 87. The train 85 may stop in any position that allows for box cars 91 (and other cars) to line up with pay line A. When the train 85 stops, the cars will be in registry with pay lines A, B and C, if three pay lines have been wagered upon by the player.

Figure 6:
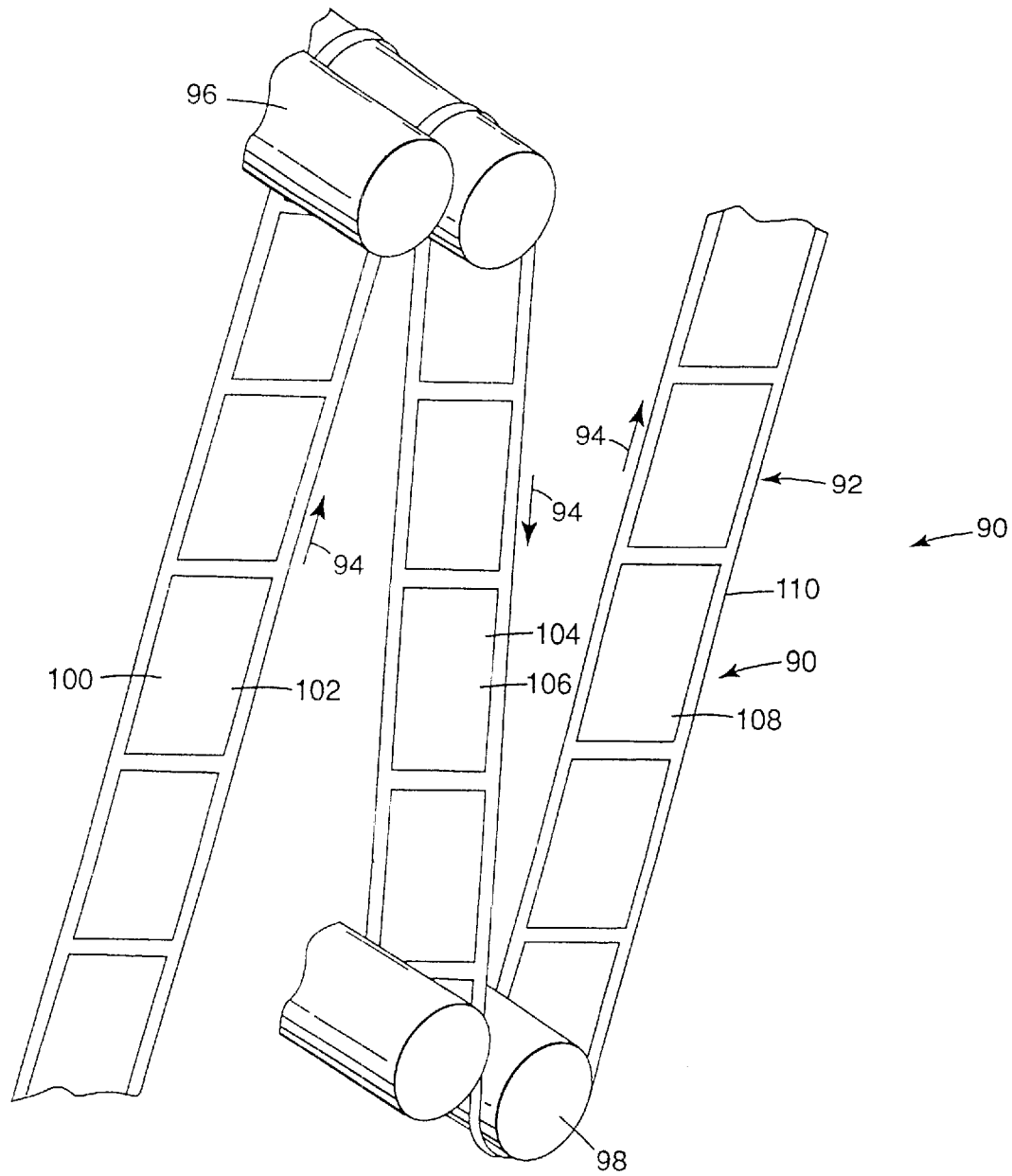
FIG. 6 shows a virtual image of a motion picture film strip carrying symbols on both surfaces which are displayed on a video screen with rollers at the top and bottom to assist in the virtual image of the continuous strip returning to a display column.

This configuration is defined as a fixed assembly continuous stream configuration. The term "fixed assembly continuous stream configuration" means that whenever one specific symbol in a specific frame along the continuous virtual film strip is a specifically ordered frame within the continuous film strip, all other symbols within all other active play frames are also always specific symbols within specific frames and in the same specific order. Therefore, observing the movement of frames past a specific viewing point, when there is a fixed assembly continuous stream configuration, the same frames will pass in the same sequence as the complete set of symbols in the continuous strip passes by. This is equivalent to the repeating pattern in a mechanical reel, however, this is a continuous stream that represents a single stream that passes through all positions (on columns and rows or in free-form) in the play of the game. It is possible, by either the programmer or the player to alter the fixed assembly continuous stream configuration by choice. For example, looking at FIG. 6, a representation is shown of a virtual continuous strip system 90. That continuous film strip configuration is represented as a single continuous film strip 92 moving along direction 94. The continuous film strip 92 moves between two virtual sets of rollers or virtual sprocket rollers 96 and 98. As with actual rollers or actual sprocket rollers (not shown), these virtual sprocket rollers 96 may be adjusted or focused, altering the distance of travel between position 100 of frame 102 and position 104 and frame 106. This alteration would not necessarily adjust the relative positions of frame 106 and frame 108. The relative position of frame 106 and the position 110 of frame 108 would be altered by 'adjusting' the position of virtual sprocket rollers 98. This would allow the player or the programmer to adjust the flow distance between frame positions. This is a unique function which does not actually remap the stream of data and therefore would be allowable under gaming laws. All that this adjustment affects is the relative distance of travel and therefore the specific alignment of a fixed flow of symbols, without changing the fixed flow of data. This feature gives the 'feel' to the player of being in more control of the play of the game. The ordering of the flow of the virtual reel may then be set up to address one, two, three or four or more different arrangements of the same orderings of the same symbols in a continuous flow pattern or flow stream of data. For example, assuming there is only a single adjustment (one frame or multiple frame shift adjustment) in the configuration of the virtual sprocket rollers of FIG. 6, the various arrangements would include, for example, pattern 1 with the virtual sprockets providing for the closest arrangements between frames 102 and 106 and frame 106 and 108, pattern 2 with the virtual sprockets providing for the closest arrangements between frames 102 and 106 and the farther separated position between frames 106 and 108, pattern 3 with the virtual sprockets providing for the farthest separation arrangements between frames 102 and 106 and the farthest separated position between frames 106 and 108, and pattern 4 with the virtual sprockets providing for the farthest separation arrangements between frames 102 and 106 and the closest position between frames 106 and 108. It is important to note again that the play of this variation in the game does not include a remapping of the stream or set of data, but merely the position of selection of that data along the stream. Gaming regulations in some jurisdictions specifically prohibit the remapping or the changing of the order of the symbols or data in a virtual reel or information pool in gaming apparatus. The methodology of this aspect of the invention allows for an alteration in the position of selection of the symbols from the data stream without alteration or remapping of the source information, making its play and variations acceptable within all jurisdictions allowing video slot games.

Figure 7:
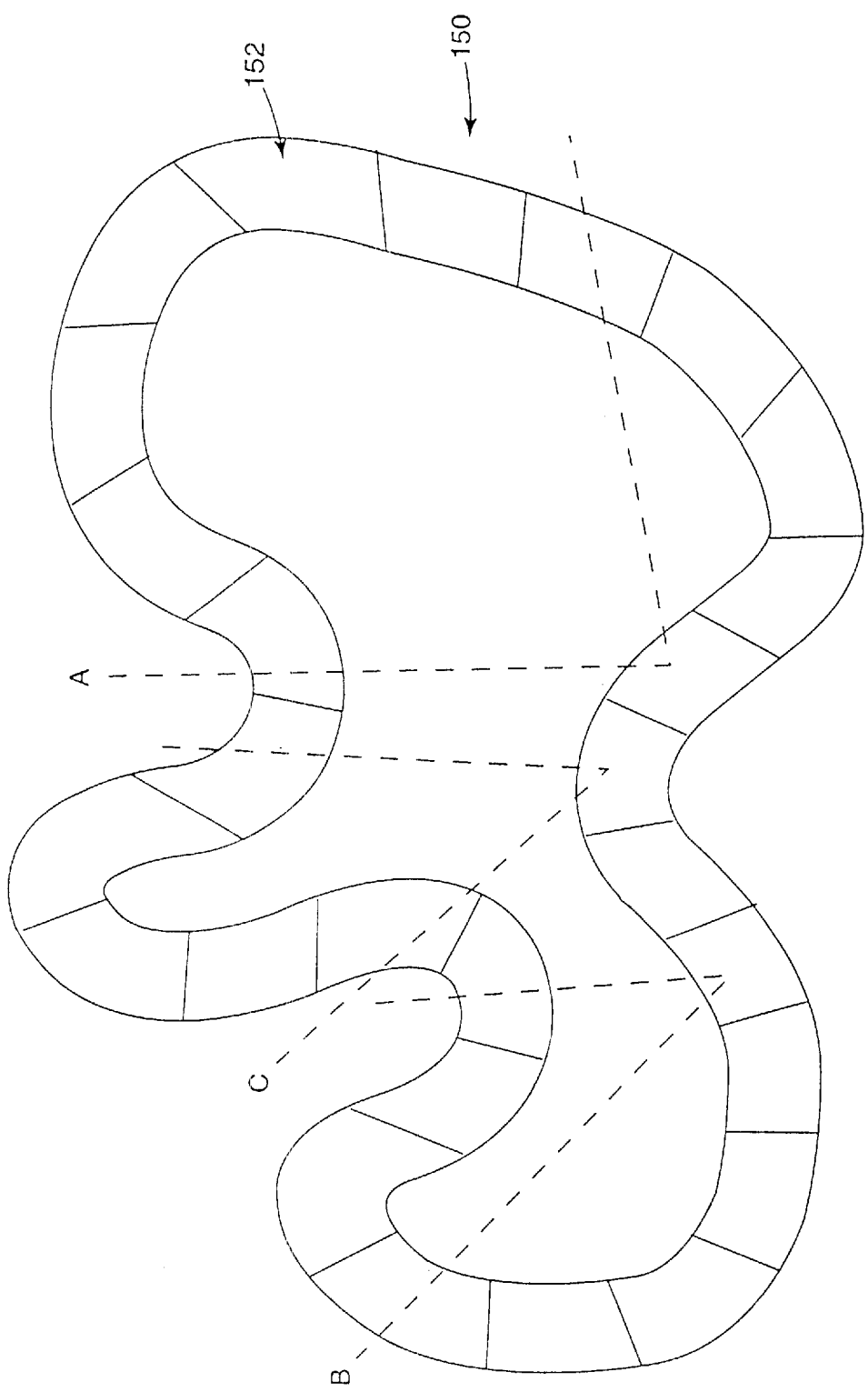
FIG. 7 shows a randomly winding film strip with a non-linearly aligned pay lines A, B and C.

FIG. 7 shows a continuous loop 150 of frames 152 that move around the screen. There may be normal linear payout positions (not shown) on non-traditional non-linear payout lines A, B and C.

Figure 8:
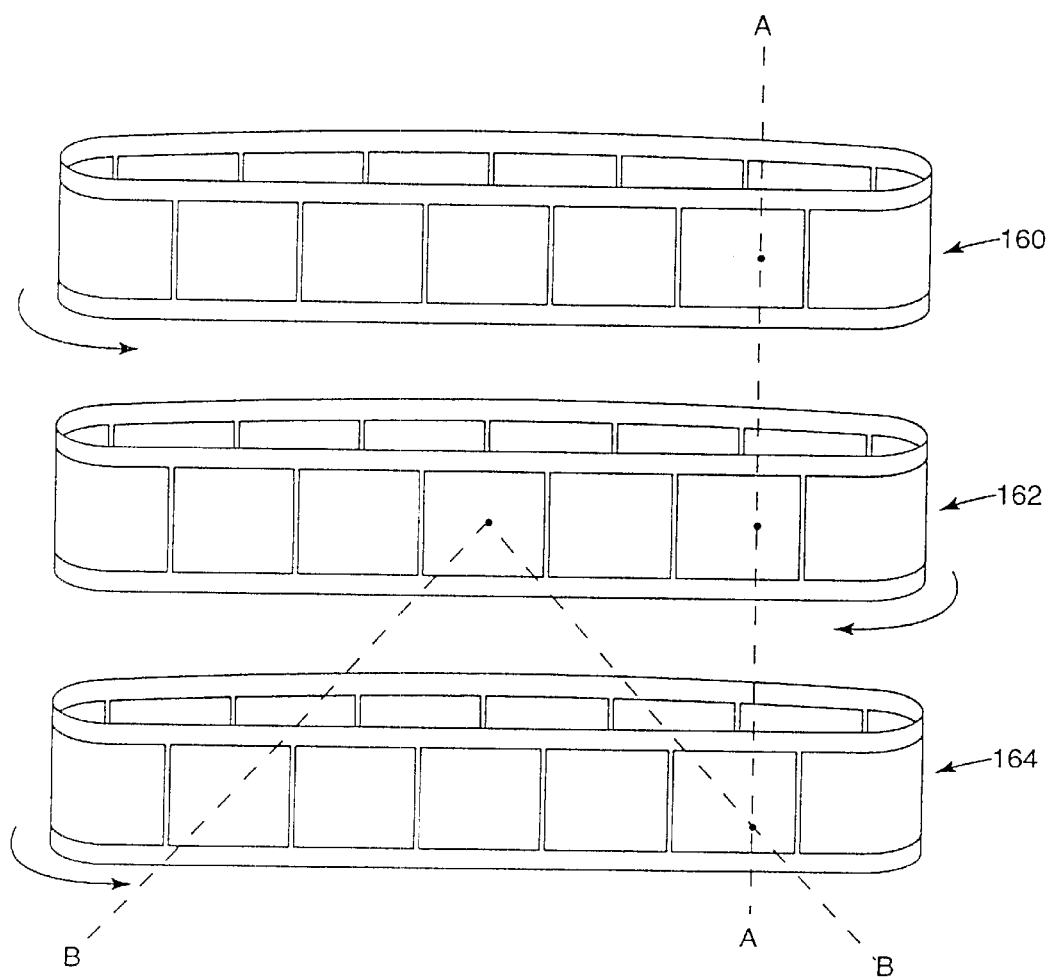
FIG. 8 shows horizontally traveling continuous film strips, with three separate film strips defining each of the three rows.

FIG. 8 shows horizontally traveling continuous film strips, with three separate film strips 160, 162 and 164 defining each of the three rows. Two of the film strips 160 and 164 are shown rotating in a counterclockwise direction when viewed from above, and the other film strip 162 is shown rotating in a clockwise direction when viewed from above. This is merely an optional and alternative visual format for practice of the present invention, with each separate row defined by a continuous film strip element.

An Exemplary Operating System

The following discussion is intended to provide a brief, general description of suitable computing environments within which the invention may be implemented. While the invention will be described in the general context of an application program that runs on an operating system in conjunction with an operating platform such as a personal computer, those skilled in the art will recognize that the invention may also be implemented in combination with other program modules. Generally, program modules include code, applets, routines, programs, components, objects, commands, data structure, etc. that perform particular tasks or implement particular abstract data types. Moreover, those skilled in the art will appreciate that the invention may be practiced with other computer system configurations, including hand held devices, multiprocessor systems, microprocessor-based or programmable consumer electronics, LAN (large area networks), WAN (wide area networks), microcomputers, mainframe computers, and the like. Multiple gaming devices may be operated out of a single mainframe or central series of computers. The invention may thus be practiced in distributed computing environments where tasks are performed by remote processing devices that are linked through a communication network. In a distributed computing environment, program modules may be located in both local and remote storage devices.

An exemplary, non-limiting system for implementing the present invention includes a conventional personal computer (also referred to as a client computer), including a processor or microprocessor, a system memory, and a system bus that couples the system memory to the processor. The system memory may include read only memory (ROM) and random access memory (RAM). A basic input/output system (BIOS) is usually stored in the ROM. The BIOS essentially contains the basic routines that help to transfer information between elements within the personal computer during certain computer operations, such as during start-up. The personal computer further may include a hard disk drive, a magnetic disk drive (e.g., that reads from and writes to a removable disk), and an optical disk drive (e.g., that reads from a CD-ROM disk or reads from or writes onto other optical media). The hard disk drive, magnetic disk drive, and optical disk drive may be connected to the system by any mechanism such as a hard disk drive interface, a magnetic disk drive interface, and/or optical disk drive interface, respectively. The drives and their associated computer-readable media provide non-volatile storage for the personal computer. Although the description of computer readable media above includes the hard disk drive, a removable magnetic disk and a removable optical disk, such as a CD, its should be readily appreciated and understood by those of ordinary skill in the art that other types of media which are readable by computer, such as magnetic cassettes, flash memory, flash memory cards, ZIPdisks, digital video disks and tapes, Bernoulli cartridges, and the like, may also be used in the exemplary operating environment.

A number of program modules may be store in the drives and RAM, such as an operating system and a network browsing program module. In general, the network browsing program module is a tool used to interact with other computers over data networks, such as the internet and the World Wide Web. The network browsing program module is also a tool capable of using downloadable program modules, such as the puzzle control module, to direct operation of the personal computer. The drives and RAM may also store other program modules, program data (such as image data, player input data, random number generators, comparator data, look-up tables, and other game play data).

The operating system, in conjunction with the BIOS and associated device drivers, may provide the basic interface between the computer's hardware and software resources, the user, and program modules such as the network browsing software module. A user may enter commands and information into the personal computer through a touch pad, activating buttons, button panels, touch screen surfaces, light wand surfaces, joy sticks, and/or a keyboard, and an input or pointing device such as a mouse. Other input devices may include a microphone (with voice recognition software), game pad, tracking ball (except for direction of the apparent skill function which must be grippable or hand manipulatable, not merely operable by contact with a flat surface of a hand), light gun, scanner, satellite dish, joy stick, light wand, or the like. These and other input devices are often connected to the processor through a serial port interface, such as a game port or a universal serial bus (USB). A monitor or other type of display device (e.g., a public view screen, integrated monitors, serial monitors, grid monitors, and the like, with any imaging format, such as CRT, plasma screen, projection viewing, liquid crystal display, light emitting diode (LED) display, etc.) is also connected to the system bus by way of an interface, such as a video adapter. In addition to the monitor, personal computers used in the gaming industry would typically include other peripheral output devices (not shown), such as peripheral light displays, audio systems, speakers, alarms, and the like.

As discussed earlier, the gaming system of the present invention is embodied in the housing, information storage, gaming modules and the like of the gaming apparatus as software, hardware or a combination of software and hardware. The information for particular games is typically stored in a game control module that essentially provides all of the information and controls and commands and responses in the play of he particular game of the invention. In one exemplary operating environment, the game control module is used in conjunction with a network browsing program module, which is supported by an available operating systems such as Microsoft Corporation's Windows 95," "Windows 98," "Windows NT," Microsoft Office" operating systems, LINUX, UNIX, MacIntosh Operating systems, or the like. However, it should be understood that the invention may be implemented for use with other network browsing program modules and with other operating systems and hardware, such as Microsoft Corporation's "Windows 3.1," "Windows 7.0" operating systems, IBM Corporation's "OS/2" and "AIX" operating systems, SunSoft Corporation's "SOLARIS" operating system, Hewlett- Packard Corporation's "HP-UX" and "RT-UX" operating systems, and the operating systems used in "MACINTOSH" computers manufactured by Apple Computer, Inc.

Although the invention has been described in the context of a gaming machine, the game could be reformatted as an arcade or personal computer game. For example, a continuous stream of game symbols could be incorporated into an arcade game, as the game play method described above gives the impression that it is a game of skill. Instead of awarding a payout, a coin operated arcade game could instead award players for pay line matches by dispensing redemption tickets or coupons. The player could be given the opportunity to observe the stream of game symbols moving along a path, and be provided with player controls that would allow the player to stop the stream of game symbols at or near a desired location. According to this game format, the game would be a pseudo skill or a skill-based game. Similarly, the game could be offered for enjoyment by users of personal computers as a wagering-style, arcade style or skill or pseudo skill-based game.

The above examples have been illustrative of a generic scope of practice for the invention and are not to be taken as limitations on the practice of the invention. Equivalents and alternatives obvious to those skilled in the various relevant arts are intended to be used within the scope of practice of the present invention.

What is claimed is:

1. A video reel slot game machine comprising a monitor and an information storage system, said information storage system providing data to said monitor of an image, the data of an image comprising an image of at least three columns of symbols selected from the group consisting of column 1, column 2 and column 3 which align said symbols in at least three rows, each of said at least three columns of symbols having symbols thereon, said symbols comprising a continuing sequence of symbols from a fixed order set of $\{a_1-a_n\}$, wherein n is the total number of symbols in said set, said continuing sequence of symbols passing from column 1 to at least one other of said at least three columns in the exact same sequence of symbols as were displayed on said monitor in column 1.

2. The video reel slot game of claim 1 wherein said image of at least three columns has the appearance of a continuous strip moving without any interruption between segments comprising frames comprising said symbols.

3. The video reel slot game of claim 2 wherein said symbols passing from column 1 to another of said at least three columns moves a virtual distance between two rows in column 1 and said another of said at least three columns when moving within a row of said at least three rows, said rows, and said virtual distance may be adjusted to increase or decrease by a programmer or player.

4. The video reel slot game of claim 1 wherein said image of at least three columns has the appearance of a continuous strip of motion picture film moving without any interruption between segments comprising frames comprising said symbols.

5. The video reel slot game of claim 4 wherein said symbols passing from column 1 to another of said at least three columns moves a virtual distance between two rows in column 1 and said another of said at least three columns when moving within a row of said at least three rows, said rows, and said virtual distance may be adjusted to increase or decrease by a programmer or player.

6. The video reel slot game of claim 1 wherein said symbols passing from column 1 to another of said at least three columns moves a virtual distance between two rows in column 1 and said another of said at least three columns when moving within a row of said at least three rows, said rows, and said virtual distance may be adjusted to increase or decrease by a programmer or player.

7. The video reel slot game of claim 1 wherein a nudge feature is provided within the game.

8. The video slot reel game of claim 7 wherein the nudge feature is player activated.

9. The video slot reel game of claim 7 wherein the nudge feature is automatically activated by the machine.

10. The video reel slot game of claim 1 wherein the image of at least three columns has the appearance of a continuous system of vehicles with frames of symbols displayed on the vehicles.

11. The video reel slot game of claim 1 wherein the image of at least three columns has the appearance of a continuous animal or a continuous series of animals with frames of symbols displayed on the sides of the animals.

12. A video reel slot game machine comprising a monitor and an information storage system, said information storage system providing data to said monitor of an image, the data of an image comprising an image of at least three columns selected from the group consisting of column 1, column 2 and column 3, each of said at least three columns having symbols thereon, said symbols comprising a continuing sequence of symbols from a fixed order set of $\{a_1-a_n\}$, wherein n is the total number of symbols in said set, said continuing sequence of symbols passing from column 1 to the other of said at least three columns in the exact same sequence of symbols as were displayed on said monitor in column 1, first passing to column 2 and then passing to column 3 from column 2.

13. The video reel slot game of claim 12 wherein said image of at least three columns has the appearance of a continuous strip moving without any interruption between segments comprising frames comprising said symbols.

14. The video reel slot game of claim 13 wherein said symbols passing from column 1 to another of said at least three columns moves a virtual distance between two rows in column 1 and said another of said at least three columns when moving within a row of said at least three rows, said rows, and said virtual distance may be adjusted to increase or decrease by a programmer or player.

15. The video reel slot game of claim 12 wherein said image of at least three columns has the appearance of a continuous strip of motion picture film moving without any interruption between segments comprising frames comprising said symbols.

16. The video reel slot game of claim 15 wherein said symbols passing from column 1 to another of said at least three columns moves a virtual distance between two rows in column 1 and said another of said at least three columns when moving within a row of said at least three rows, said rows, and said virtual distance may be adjusted to increase or decrease by a programmer or player.

17. The video reel slot game of claim 12 wherein said symbols passing from column 1 to another of said at least three columns moves a virtual distance between two rows in column 1 and said another of said at least three columns when moving within a row of said at least three rows, said rows, and said virtual distance may be adjusted to increase or decrease by a programmer or player.

18. A video reel slot game machine comprising a monitor and an information storage system, said information storage system providing data to said monitor of an image, the data of an image comprising an image of at least two columns of symbols selected from the group consisting of column 1 and column 2 which align said symbols in at least three rows, each of said at least two columns of symbols having symbols thereon, said symbols comprising a continuing sequence of symbols from a fixed order set of $\{a_1-a_n\}$, wherein n is the total number of symbols in said set, said continuing sequence of symbols passing from column 1 to at least one other of said at least two columns in the exact same sequence of symbols as were displayed on said monitor in column 1.

19. A video reel slot game machine comprising a monitor and an information storage system, said information storage system providing data to said monitor of an image, the data of an image comprising an image of an apparently continuous stream of symbols which appear on the monitor, said symbols comprising a continuing sequence of symbols from a fixed order set of $\{a_1-a_n\}$, wherein n is the total number of symbols in said set, said continuing sequence of symbols passing in a continuous, connected set of symbols on the screen.

20. The video reel slot game machine of claim 19 wherein a payout line is included in the play of the game machine that is not a straight line.

21. A video reel slot game machine wherein at least three columns or at least three rows each comprise an image of an apparently continuous stream of symbols which appear on the monitor, said symbols comprising a continuing sequence of symbols from a fixed order set of $\{a_1-a_n\}$, wherein n is the total number of symbols in said set, said continuing sequence of symbols passing in a continuous, connected set of symbols on the screen for each of said columns or rows.

* * * * *